(12) United States Patent
Lugitsch et al.

(10) Patent No.: US 12,493,114 B2
(45) Date of Patent: Dec. 9, 2025

(54) RADAR SYSTEM AND A RADAR METHOD FOR COMPENSATING A CARRIER CHARACTERISTIC OFFSET

(71) Applicant: NXP B.V., Eindhoven (NL)

(72) Inventors: David Lugitsch, Graz (AT); Reinhold Schmidt, Graz (AT)

(73) Assignee: NXP B.V., Eindhoven (NL)

( * ) Notice: Subject to any disclaimer, the term of this patent is extended or adjusted under 35 U.S.C. 154(b) by 322 days.

(21) Appl. No.: 17/936,887

(22) Filed: Sep. 30, 2022

(65) Prior Publication Data

US 2023/0142169 A1 May 11, 2023

(30) Foreign Application Priority Data

Nov. 9, 2021 (EP) .................................... 21207173

(51) Int. Cl.
*G01S 13/534* (2006.01)
*G01S 7/41* (2006.01)

(52) U.S. Cl.
CPC ............ *G01S 13/534* (2013.01); *G01S 7/414* (2013.01); *G01S 7/415* (2013.01)

(58) Field of Classification Search
CPC .............. G01S 7/352; H03L 7/07; H03L 7/08
See application file for complete search history.

(56) References Cited

U.S. PATENT DOCUMENTS

| | | | | |
|---|---|---|---|---|
| 5,677,927 A * | 10/1997 | Cowie | ................. | H04B 14/026 375/259 |
| 2008/0165046 A1 * | 7/2008 | Fullerton | ................ | G01S 7/003 342/21 |
| 2012/0050103 A1 * | 3/2012 | Revol | ................. | G01S 13/9058 342/357.68 |
| 2018/0284258 A1 * | 10/2018 | Roger | ................... | G01S 13/003 |
| 2019/0317207 A1 * | 10/2019 | Schroder | ............... | G01S 13/325 |
| 2020/0166622 A1 * | 5/2020 | Small | ................. | G01S 13/4454 |
| 2020/0300965 A1 | 9/2020 | Wu et al. | | |
| 2021/0263132 A1 * | 8/2021 | Ranney | ............... | G01S 13/9058 |

FOREIGN PATENT DOCUMENTS

EP 3869223 A1 8/2021

OTHER PUBLICATIONS

Johnsen, T., "Time and frequency synchronization in multistatic radar. Consequences to usage of GPS disciplined references with and without GPS signals", Proceedings of the 2002 IEEE Radar Conference, Apr. 25, 2002.

Kilic, Y., "Device-Free Person Detection and Ranging in UWB Networks", IEEE Journal of Selected Topics in Signal Processing, vol. 8, Issue 1, Feb. 2014.

* cited by examiner

*Primary Examiner* — Vladimir Magloire
*Assistant Examiner* — Nazra Nur Waheed

(57) ABSTRACT

A radar system configured to compensate for a carrier characteristic offset includes a transmitter that transmits a code signal based on a transmitter carrier characteristic and a receiver that receives an echo of the code signal based on a receiver carrier characteristic. Additionally, the radar system includes a control unit that identifies a tracking path between the transmitter and the receiver that is at least partially independent from the path of the code signal and the echo of the code signal. Using an index of the tracking path, the code unit estimates a carrier characteristic offset between the transmitter and the receiver and then compensates for this estimated carrier characteristic offset.

18 Claims, 3 Drawing Sheets

RADAR SYSTEM AND A RADAR METHOD FOR COMPENSATING A CARRIER CHARACTERISTIC OFFSET

CROSS-REFERENCE TO RELATED APPLICATIONS

This application claims the priority under 35 U.S.C. § 119 of European Patent application no. 21207173.2, filed on 9 Nov. 2021, the contents of which are incorporated by reference herein.

TECHNICAL FIELD

The present disclosure relates to a radar system comprising a transmitter, a receiver, and a specific control unit. Furthermore, the disclosure relates to a method of operating a radar system. Thus, the present disclosure may refer to the technical field of radar operations.

TECHNICAL BACKGROUND

Radar operations apply radio waves to determine properties such as distance, angle, or velocity of a target (object or person of interest). Thereby, a transmitter emits a radio wave signal to the target, while a receiver obtains an echo of the signal that has been reflected by the target.

In a radar system/arrangement such as a network, e.g. a UWB radar network, multiple devices are employed to create a map of static and dynamic targets (reflectors). As these nodes (devices) are spatially separated, no physical connection of these devices is desired. All devices in the radar network generally use independent oscillators as a clock/time reference, each one introducing a part to part spread, i.e. a carrier frequency/phase offset.

As an example, reference is made to a conventional system with a transmitter device and a receiver device, both attached to the front of a car. The transmitting radar device transmits multiple (UWB) radar frames (each frame consists of multiple symbols and one symbol consists of multiple pulses) with a defined frame repetition period. In general, the duration of a frame can be shorter than the frame repetition period. This may lead to a pause between frames, which can be used to switch off the carrier frequency/phase generation to save energy. In the receiving device, the symbols (or pulses) within one frame are integrated to gain a high signal/noise (S/N) ratio. This operation leads to one CIR (Channel Impulse Response) per frame. However, due to the different carrier signal frequency/phase of the transmitting device and the receiving device, there will be a frequency/phase offset.

Without synchronization of the (at least two devices in a radar arrangement), the carrier frequency/phase offset between the devices may result in a constantly decreasing or increasing frequency/phase of the sampled data at the receiving device. The negative effects of such continuously changing frequency/phase may include for example:

- incoherent integration of symbols or pulses of the frames,
- artificial Doppler frequency introduced in a ranging measurement (see Doppler map), e.g. if there is a constant carrier frequency offset between transmitting device and receiving device,
- unusable ranging measurement, if the carrier frequency offset has a random start phase from frame to frame. This is the case, e.g., if the carrier phase-locked loop (PLL) is switched off during the frames to save energy.

Such drawbacks in a conventional radar arrangement are illustrated in FIGS. 6 and 8, using a simulation of the Fourier-transformed (FFT) CIR matrix. The CIRs of multiple frames can be graphically represented by such an FFT-CIR map (see FIG. 6). The same holds true for a range measurement, for which the above identified Doppler map is applied (see FIG. 8). FIG. 6 shows a simulation of a conventional FFT-CIR matrix of a line-of-sight path measurement without a carrier characteristic offset compensation. The arbitrary phase (a carrier characteristic) renders a coherent addition of the CIRs impossible. FIG. 8 illustrates a simulation of a conventional distance measurement which includes a movement (ranging measurement shown as FFT-CIR Doppler map) without a carrier characteristic offset compensation. The moving target cannot be clearly observed, and the line-of-sight path is unidentifiable. Further, if the carrier signal is switched off between the frames/packets, the velocity information is even unusable in the unsynchronized case.

In other words, the unsynchronized carrier characteristics of the transmitter/receiver lead to low intensity (S/N ratio, amplitude) of the CIR and void, unusable measurement data. The data quality of such measurements may be thus very low and may not allow for the intended use. In (radar) communication systems, the carrier characteristic offset compensation is a well-known problem. In conventional systems, it is intended to compensate for the movements of the communicating devices or the movements of targets between them. Military radar systems, for example, often use the Global Positioning System (GPS) to synchronize the carrier frequency offset. A wireless synchronization with the radar signal itself can usually not be used here, because it cannot be ensured that there is a path between the transmitter and receiver that is not distorted by movements.

OBJECT AND SUMMARY OF THE DISCLOSURE

There may be a need to compensate for a carrier characteristic offset in a radar system in an efficient and reliable manner.

A radar system and a radar method according to the independent claims are provided.

According to an aspect of the present disclosure, there is described a radar system, comprising:

i) a transmitter having a transmitter carrier (signal) characteristic (frequency and/or phase), configured to transmit a code signal (in particular comprising a plurality of code symbols), ii) a receiver having a receiver carrier (signal) characteristic, configured to receive at least one echo of the code signal, and iii) a control unit configured to:

a) identify a carrier characteristic tracking path (such a path may comprise one or more paths between transmitter and receiver) between the transmitter and the receiver, b) estimate an offset between the transmitter carrier characteristic and the receiver carrier characteristic based on the identified tracking path, and c) compensate for the offset (in particular establish coherency) based on the estimation.

In particular, the tracking path comprises a communication path (in particular a static path) that is at least partially (in particular partially or fully) independent of the code signal and the echo of the code signal (i.e. the radar path).

According to a further aspect of the present disclosure, there is described a method of operating a radar system, the method comprising:

i) transmitting a code signal by a transmitter having a transmitter carrier characteristic,
ii) receiving an echo of the code signal by a receiver having a receiver carrier characteristic,
iii) identifying a carrier characteristic tracking path between the transmitter and the receiver,
iv) estimating an offset between the transmitter carrier characteristic and the receiver carrier characteristic based on the identified tracking path, and
v) compensating the offset based on the estimation.

In particular, the tracking path comprises a communication path that is at least partially independent of the code signal and the echo of the code signal.

In the context of the present document, the term "code" may in particular refer to any kind of information that has been converted (encoded) in a specific manner and can be transmitted (and received). A code may comprise a code sequence of the encoded information. Hereby, an information may be encoded as a so-called "code symbol". The term "(code) symbol" may particularly denote a (discrete) piece of information (or data) that is contained in a (radiofrequency) signal (i.e. waves in the electromagnetic spectrum). A symbol may also be called a character or a string (of characters). A code sequence may then comprise at least one code symbol, in particular a plurality of code symbols. After communication, the code may be decoded (from code symbol to information) to obtain again the original information. In an example, a code may comprise a sequence of code symbols, wherein each code symbol comprises one or more encoded bits. Encoding may be done using digital modulation, for example phase-shift keying (PSK). A code may also comprise a training sequence. Examples of code symbol types may include a binary, ternary, or higher order scheme.

In the context of the present document, the term "radar system" may refer to any system with a transmitter and at least one receiver, wherein a (code) signal transmitted by the transmitter is received by the (at least one) receiver. Even though most examples have been described in this document with respect to ranging radar operations and pulse radar operations (in particular UWB), the described radar system can also be implemented for example in an Internet of Things (IoT) environment.

In the context of the present document, the term "control unit" may in particular refer to any hardware or software suitable to perform the described operation of identifying, estimating, and compensating. The control unit may be implemented in the receiver device, in the transmitter device, or anywhere else in the radar system. For example, the control unit may also operate remote from transmitter and receiver. The control unit may be realized as a processor or a plurality of processors. Further, the control unit may be realized as a program (product).

In the context of the present document, the term "carrier (signal) characteristic" may refer to a specific property of the carrier signal, for example the carrier frequency and/or the carrier phase. Due to different clocks in the transmitter and the receiver, each device may comprise a (slightly) different carrier characteristic. The difference between the (unsynchronized) carrier characteristics may be termed "carrier characteristic offset".

In the context of the present document, the term "tracking path" may refer to a specific path or a plurality of specifically combined paths between a transmitter and at least one receiver that can be used to estimate and compensate for a carrier characteristic offset. In an embodiment, the tracking path is a static (communication) path, for example the line-of-sight path. The tracking path does not have to be the path with the highest S/N ratio. A specific task of the control unit may be to identify the (best suitable) tracking path(s) from a plurality of different paths. In an embodiment, a communication of a training sequence may be applied to identify the tracking path before performing a radar operation. A dynamic path (that includes a movement) may not be suitable as the tracking path. Nevertheless, a dynamic path (in particular if only the transmitter/receiver instead of the target moves) may be taken into account, when identifying the tracking path. In an embodiment, a plurality of paths (including at least one static path) may be combined (e.g. using a combiner) to yield the tracking path. In the latter case, the tracking path may e.g. comprise a static communication path and a (dynamic) radar path.

In the context of the present document, the term "at least partially independent" may refer to the circumstance that the tracking path does not rely completely on a radar path (signal and echo) alone. In an example, a static communication path is identified as the tracking path and in this case, the tracking path is independent from the radar path. In another example, the tracking path comprises a combination of a static path and a further path that results form an echo of the radar path. In this case, the tracking path is only partially independent of the radar path.

According to an exemplary embodiment, the present disclosure may be based on the idea that a carrier characteristic offset in a radar system can be compensated in an efficient and reliable manner, when a tracking path is identified for estimating the carrier characteristic offset between transmitter and receiver, wherein said tracking is at least partially independent of the radar path. Based on the identified tracking path and the estimated carrier characteristic offset, said offset may be efficiently compensated for, i.e. the transmitter and receiver carrier signals can be synchronized (coherence established).

Without compensation/synchronization, there may be no reliable (velocity) information with respect to a target of interest, and a (multistatic) radar cannot achieve the desired radar S/N ration. However, with the present disclosure, an intensity (S/N ratio) boost, due to coherent integration in the synchronized case, may be established. In other words, wireless synchronization (without physical connection such as common clock source, trigger input, etc.) of the carrier frequency/phase offset in a radar system establishes coherency between the devices. Hereby, the issue of synchronizing nodes in a (multistatic) radar system may be overcome on-the-fly.

DESCRIPTION OF EXEMPLARY EMBODIMENTS

In the following, further exemplary embodiments of the device, the system, the method and the use will be explained.

In an embodiment of the present disclosure, the tracking path comprises a static (communication) path. Thereby, issues with the movement (Doppler effect) may be excluded and do not have to be compensated for. In an example, the tracking path applies only (one or more) static path(s).

In an example, the receiving radar devices are compensating their carrier frequency/phase offset with respect to the transmitting radar device. The devices are arranged so that there is at least one static communication path between them that can be used for synchronization. The index (time offset)

of the static path is known and the index of the tracking path is then configured to be the static path index.

In a further embodiment of the present disclosure, the (static) communication path comprises at least one of the following:
  i) the shortest distance between transmitter and receiver,
  ii) the line-of-sight path (LoS) between transmitter and receiver,
  iii) a path that is not the highest S/N ratio path between transmitter and receiver.

In a further embodiment of the present disclosure, the carrier characteristic comprises at least one of the carrier frequency and the carrier phase. Compensating for the offset between carrier frequency and/or carrier phase may significantly improve the quality of the radar operation result.

In a further embodiment of the present disclosure, the identification of the tracking path comprises communicating a communication signal (via a communication path), in particular a calibration sequence and/or a training sequence, between the transmitter and the receiver.

For example, the setup is calibrated/trained without including a moving object (in particular the target). Echoes of the calibration/training response or part of it might then be used to specify the tracking path.

In an example, the chip is in communication mode, and the tracking path is a combination of the strongest (S/N) paths in the environment. In a post-process step, the estimated CIR is analyzed and it is searched for the line-of-sight path. The index (time offset) of the found line-of-sight path may then be used in radar mode as the tracking path index. The index of the static path may be estimated by sending a communication frame (as described above) with a (first) path detection algorithm.

In a further embodiment of the present disclosure, the tracking path comprises a combination of at least two (static) paths. In particular, at least one of the paths is a static path and/or at least one path comprises an echo of the code signal ((dynamic) radar path).

By combining more than one path to yield the tracking path, the quality of estimating/compensating for the offset may be further improved. If there is more than one static path between transmitting and receiving device, some static paths can be combined. The combined path may be then the tracking path and can have a higher S/N ratio than one static path alone. Thereby, the synchronization may be improved.

In an example, an echo of the code signal may be used for tracking, when independent from the echo of interest. The difference of the tracking path and the echo may be only a time shift/delay. When the code signal is transmitted/sent out, multiple echoes are received and some may be identified to be used in the tracking path. The tracking path may be quasi time invariant, because there might be variance that is known. In contrast, the echo of interest (that should be processed) may be time variant.

In an example, both radar devices are mounted on the bumper of a car. On the one hand, there is a direct communication path (first path) between them, and, on the other hand, there is a (second) path that reflects from the engine block and then reaches the receiving device. This second path is a static echo, because there could be no movement in this area. This static echo could be combined with the direct communication path (first path) to one tracking path.

In a further embodiment of the present disclosure, the estimation of the offset further comprises correlating the echo of the code signal, in particular symbol-per-symbol, to a code template. In this example, the control unit takes into account, besides of the communication path, an echo of the code signal (radar path), when identifying the tracking path.

In an example, the tracking path may be the result of a correlation. In this case, the received data (echo of code signal) may be correlated with a known symbol (template). This can be used for example, if the S/N ratio of the tracking path is too low. Specifically, in UWB systems this issue may occur, because the transmitting power is strongly regulated in UWB systems. The assumption here is that the carrier frequency offset may be negligible for the time of one symbol.

In a further embodiment of the present disclosure, the estimation of the offset further comprises accumulate, in particular average, a plurality of symbols of the echo of the code signal. The tracking path may be the result of such an accumulation. The assumption here is that the carrier frequency offset may be negligible for the time of the accumulation.

In a further embodiment of the present disclosure, the control unit is configured to compensate for the effect of a movement of at least one of the transmitter and the receiver. In a further embodiment of the present disclosure, the control unit is configured not to compensate for the effect of a Doppler shift, in particular when the Doppler shift is caused by a movement of a target (since this may be the desired information).

The proposed procedure may make sure that the devices are synchronized and that the devices keep synchronized by tracking the signal(s) using the tracking path. Preferably, the synchronization may not compensate/track the Doppler shift, so that the data of the radar paths can be used to generate a range information based on a Doppler map. In other words, a communication hardware (radar system) is used to estimate the carrier frequency offset and further, a portion of the received multipaths is identified to track the carrier frequency offset. Hereby, the radar multipath components may not be tracked to keep the valuable Doppler shift information. This information can then be used to enhance the radar measurements.

In a further embodiment of the present disclosure, the control unit is further configured to reconfigure the offset compensation for each transmitted code signal, in particular for each packet/frame. The radar frame may be an arrangement of several preambles and may therefore be well suited for synchronization.

At least one of the radar devices may move, whereby the position of the devices may be known at any time, so that this information can be used to compensate the movement. This means that the tracking path index is reconfigured for each frame (or packet), based on the current position of the devices. In general, the tracking path index can be reconfigured for each frame, e.g. if the transmitting device is changed from frame to frame and therefore another static path may be used.

In a further embodiment of the present disclosure, the control unit is further configured to perform an optimization loop to optimize the compensation of the offset. In this manner, several information/paths may be taken into account to improve (step-by-step) the offset estimation/compensation (see FIG. 3 below for details).

In a further embodiment of the present disclosure, the optimization loop comprises a combiner (e.g. a RAKE receiver) configured to combine at least two paths (in particular at least one communication path being independent of the radar path and at least one echo of the code signal being dependent on the radar path) to yield the tracking path.

Thereby, a plurality of information may be combined to further improve the synchronization operation.

In a further embodiment of the present disclosure, the radar system is implemented as one of a monostatic radar application, a multi-static radar application, a statistical MIMO application, a coherent MIMO application. Thus, the described approach may be implemented in a variety of industry-relevant radar applications in an efficient and robust manner.

The term MIMO (multiple-input, multiple-output) may refer to a method for multiplying the capacity of a radio link using multiple transmission and receiving antennas to exploit multipath propagation. A multi-static radar uses distributed transmitters and receivers (different viewing aspect of target), while statistical MIMO uses combined transmitter-receiver on these locations (providing additional information). Coherent MIMO uses closely located transmitter-receivers (same viewing aspect of target) to enable calculation of virtual array antennas.

For a monostatic radar with a shared clock source between receiver and transmitter, a compensation is in general not required, because there is coherency. Nevertheless, one may use the described synchronization techniques to compensate for drifts in the phase noise (e.g. due to heating effects or due to a random starting phase of the local oscillator of the carrier generation).

In a further embodiment of the present disclosure, the radar system is a pulse radar system, in particular configured for transmitting and receiving ultra-wide band (UWB) signals, and echoes thereof. Thereby, the described radar system may be implemented in the growing technical field of UWB radar applications.

A specific kind of radar applies ultra-wide band (UWB) technology. The term "UWB" may refer to a radio technology that can use a very low energy level for short-range, high-bandwidth communications over a large portion of the radio spectrum. UWB may refer to a technology for transmitting information spread over a large bandwidth (>500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth, thus enabling pulse-position or time modulation. The range of UWB may be for example in the range of tens of meters. The basic operation of a (UWB) radar system consists of transmitting a signal with a certain code sequence and simultaneously correlating that code sequence with the received signal (echo).

In a further embodiment of the present disclosure, the code signal comprises code symbols that respectively encode a plurality of bits using a digital modulation scheme. Digital modulation may comprise one of phase-shift keying (PSK), frequency-shift keying (FSK), amplitude-shift keying (ASK. Ternary codes may further require on-off keying (OOK), 100% ASK and/or pulse position modulation.

In a further embodiment of the method of the present disclosure, identifying, in particular compensating, is done before transmitting and receiving. The tracking path should be known in advance and can then be stored in the memory of the system. Preferably, the tracking path is determined prior to the radar operation. This can be achieved, for instance, by exchanging a communication frame where the tracking path is determined with a first path detection algorithm.

According to a further embodiment, the transmitter and the receiver are integrated in a common device. According to a further embodiment, the transmitter and the receiver are integrated in spatially separate devices. A transmitting device may also act as receiving device for its own transmitted signal. In this case only the random starting phases of the oscillators may be synchronized.

In a further embodiment of the present disclosure, the radar system is applied in at least one of the group, which consist of: a multi-static short range car radar with a keyless entry system (parking assistant), a multi-static in-cabin radar for advanced radar sensing with high S/N ratio requirements (life sign detection, breathing detection, gesture recognition), breathing detection in healthcare, sudden infant death alerts, indoor passive (device-free) localization, IoT gesture and presence detection.

BRIEF DESCRIPTION OF THE DRAWINGS

The illustrations in the drawings are schematic. In different drawings, similar or identical elements are provided with the same reference signs.

DETAILED DESCRIPTION OF THE DRAWINGS

Figure 1:
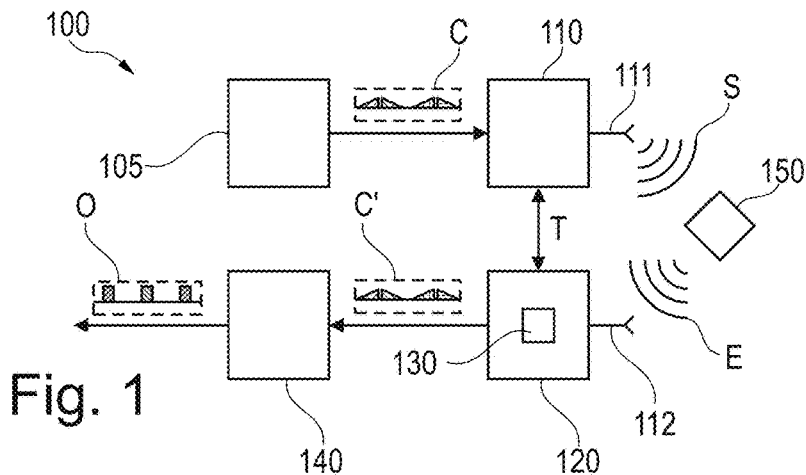
FIG. 1 illustrates a radar system according to an exemplary embodiment of the present disclosure.

Before, referring to the drawings, exemplary embodiments will be described in further detail, some basic considerations will be summarized based on which exemplary embodiments of the present disclosure have been developed.

According to exemplary embodiments of the present disclosure, the advantages of both areas, communication and radar, are combined. In particular an UWB device can be very suitable herefore. In the communication mode, a training sequence (preamble) is used to roughly estimate the carrier frequency/phase offset. After this rough estimation, an optimization loop takes over. For the tracking path, there should be no physical movement and the Doppler effect may only be caused by the carrier frequency offset. Well-suited for this condition may be the line-of-sight path.

According to exemplary embodiments of the present disclosure, it is desirable to identify a path which is used to track the carrier frequency offset and to measure a CIR with a high S/N ratio. A radar frame hereby differs from a ranging and a communication frame, since in a radar frame, a large number of symbols or pulses are coherently accumulated to gain S/N.

In this specification, embodiments have been presented in terms of a selected set of details. However, a person of ordinary skill in the art would understand that many other embodiments may be practiced which include a different selected set of these details. It is intended that the following claims cover all possible embodiments.

FIG. 1 is a schematic illustration of a radar system 100 according to an exemplary embodiment of the present disclosure. The radar system 100 comprises a transmitter 110 with a transmitter code generation unit 105, which is configured for generating a code C. It is schematically shown that the code C comprises a plurality of symbols. The transmitter 110 is configured for generating a signal S from the code C, and further configured for transmitting the signal S via an antenna 111. The transmitter 110 has a transmitter carrier characteristic which is different from a receiver carrier characteristic of an associated receiver 120, i.e. there is an offset in the carrier signal frequency and/or phase.

The radar system 100 further comprises a receiver 120, configured for receiving an echo E of the signal S via a further antenna 112. Hereby, the signal S is reflected from a target 150 (object of interest) as the echo E. The receiver 120 can be associated with a correlator 140, configured for correlating the code C' of the received echo E with a code template.

The radar system 100 is further configured, as is exemplary shown in FIG. 1, to produce an output signal (in particular a correlator output O), which may, for example, be a visual output, or in general, any digital or analogue output for further processing. For example, once the echo E has been received, it may be demodulated, e.g. by a higher order digital modulation method according to exemplary embodiments.

The radar system 100 comprises a control unit 130 which is, in the shown Figure, implemented in the receiver 120. Nevertheless, the control unit 130 could also be implemented in the transmitter 110 or somewhere else in the radar system 100. The control unit 130 is configured to identify a carrier characteristic tracking path T between the transmitter 110 and the receiver 120. In the example shown, the tracking path T is a static communication path, in particular the line-of-sight path. Thus, in this embodiment, the tracking path T comprises a communication path that is independent of the code signal S and the echo E of the code signal S (i.e. the radar path).

The control unit 130 is further configured to estimate the offset between the transmitter carrier characteristic and the receiver carrier characteristic based on the identified tracking path T, and to compensate the offset based on the estimation. Thereby, a coherency between transmitter 110 and receiver 120 carrier frequency/phase can be established which leads to significantly improved radar measurements (see FIGS. 5 and 7 below).

Figure 2:
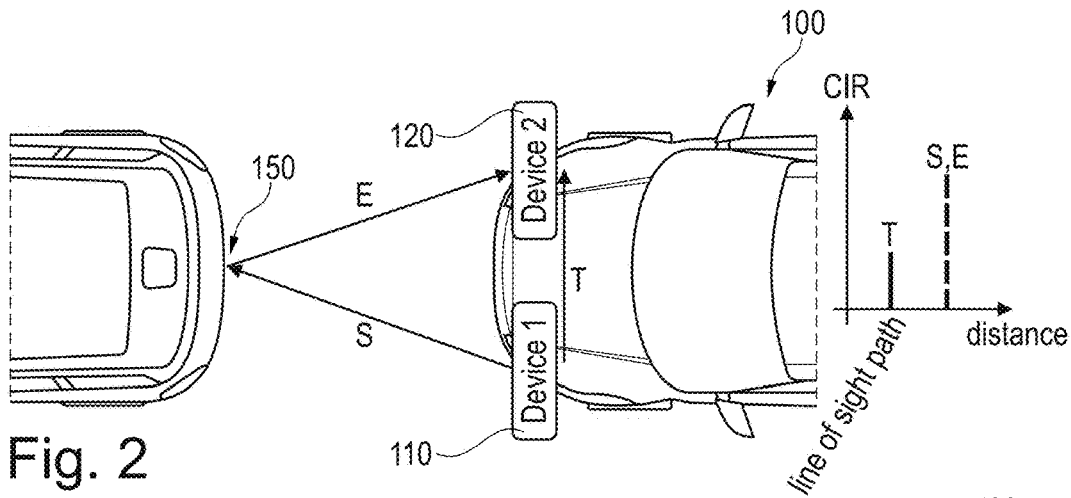
FIG. 2 illustrates a radar system according to a further exemplary embodiment of the present disclosure.

FIG. 2 is an illustration of a radar system 100 according to a further exemplary embodiment of the present disclosure. The radar system 100 can be configured in a very similar manner as described for FIG. 1 above. In this example, the radar system 100 is arranged at the front of a car. While the transmitter device 110 is attached to the left side of the car front, the receiver device 120 is attached to the right side of the car front. The code signal S transmitted by the transmitter 110 is reflected at a target 150, being another car, and the echo E is received by the receiver 120. The path of S and E can be termed the radar path, while a line-of-sight path, along the front of the car, can be termed the communication path. In this example, there is a movement in the radar path (since the other car is driving), while the communication path is a static path. The diagram on the right side shows that the intensity (S/N ratio) of the radar path S, E is much higher than the intensity of the communication path T. Nevertheless, the distance of the radar path is much longer and there is a movement. As a consequence, the static communication path (which is in this example independent of the radar path S, E) is applied as the tracking path T (see also FIG. 4).

Figure 3:
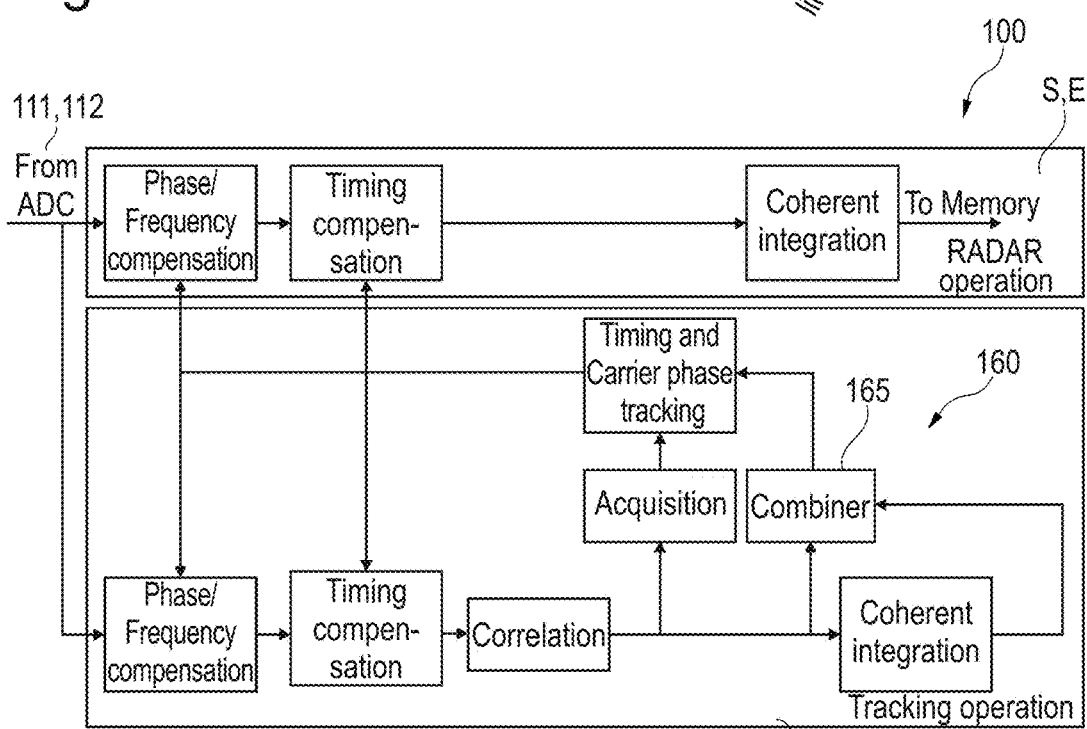
FIG. 3 illustrates a radar system according to a further exemplary embodiment of the present disclosure.

FIG. 3 illustrates a specific implementation of the radar system 100 according to a further exemplary embodiment of the present disclosure. FIG. 3 shows operation steps associated with the radar path S, E alone (radar operation) and steps associated only with the tracking path T (tracking operation). Signals received at the antenna 111, 112 are transferred via analog functionalities and an A/D converter to the carrier characteristic (frequency/phase) offset compensation performed by the control unit 130. Regarding the radar operation, the compensated carrier characteristic is time compensated, coherency integrated, and then further processed, e.g. stored in a memory.

The tracking operation comprises in this example a sophisticated estimation and compensation of the carrier characteristic offset operation. The tracking path T comprises a combination of at least two paths, including a static path (independent of the radar path) and an echo E of the code signal S (only partially independent of the radar path). Said echo E of the code signal is correlated (symbol-per-symbol) to a code template. The correlation can be done before or after a timing compensation step (in this example, after). Further, the control unit 130 is configured to perform an optimization loop 160 to optimize the compensation of the offset. In the example shown, a combiner is used (which is implemented here as a RAKE receiver 165) to combine the different path that yield the tracking path T.

In other words, this radar system 100 requires two receiving paths, wherein the first receive path being for radar mode with a phase/frequency compensation (mixer), a re-sampler for timing compensation, and a symbol accumulation, while the second receive path is used for searching and tracking the carrier frequency/phase offset, having in addition acquisition and tracking support. The acquisition is used to synchronize to a multipath component of the received signal. Contrary to a communication mode, where it would be used to find the strongest path, in this mode of operation, a distinctive path is defined of which a phase and frequency offset is estimated.

In this example, the tracking path itself (a complex number) is the result of the correlation of the input signal and the known symbol at the configured tracking path index. After the acquisition has found a rough carrier frequency and phase offset based on the tracking path, the tracking (optimization) loop 160 takes over. This loop 160 can be updated on a symbol basis. The tracking loop 160 keeps the phase of the tracking path to be zero in this example. Optionally, a combiner (e.g. a RAKE receiver) 165 can be used to combine multiple (static) paths to one tracking path. The output of the combiner 165 is then used as the tracking path T. The receive path in radar mode is only used for coherent integration of received data. The start time of the coherent integration is configurable such that the timing and carrier-phase tracking loop has settled to a stable carrier frequency offset estimation.

Figure 4:
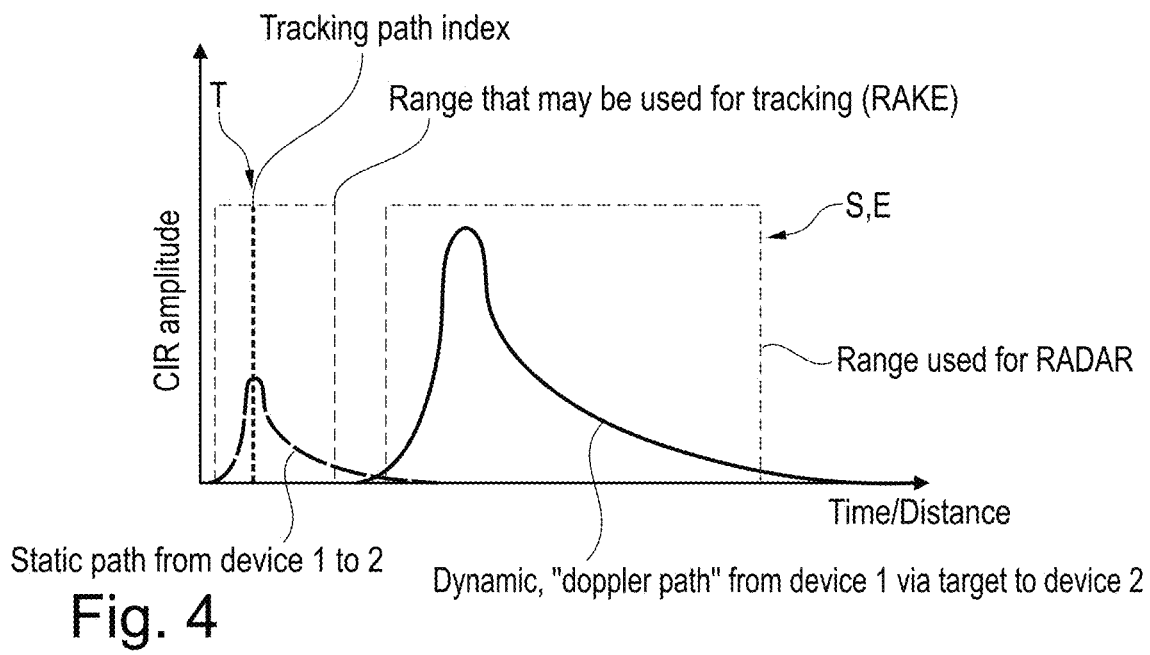
FIG. 4 illustrates a tracking path and a radar path according to a further exemplary embodiment of the present disclosure.

FIG. 4 illustrates a channel impulse response according to an exemplary embodiment of the present disclosure. In particular, FIG. 4 illustrates in detail the diagram shown on the right side of FIG. 2. The intensity (CIR amplitude) of the static communication path (one or more of the static paths can be identified as the tracking path T) is significantly lower than the intensity of the radar path S, E. At the same time, the tracking path T is much shorter (see distance) and does not comprise a movement (Doppler effect). The static path is obligatory and can employ a random phase and frequency offset, introduced by oscillator mismatches. The dynamic path faces the same phase and frequency offset but comprises on top also the Doppler shift. The solid line (curve) can be seen as the connection of individual paths. How close these paths are to each other can be defined by the sampling rate, for example around 15 cm.

Figure 5:
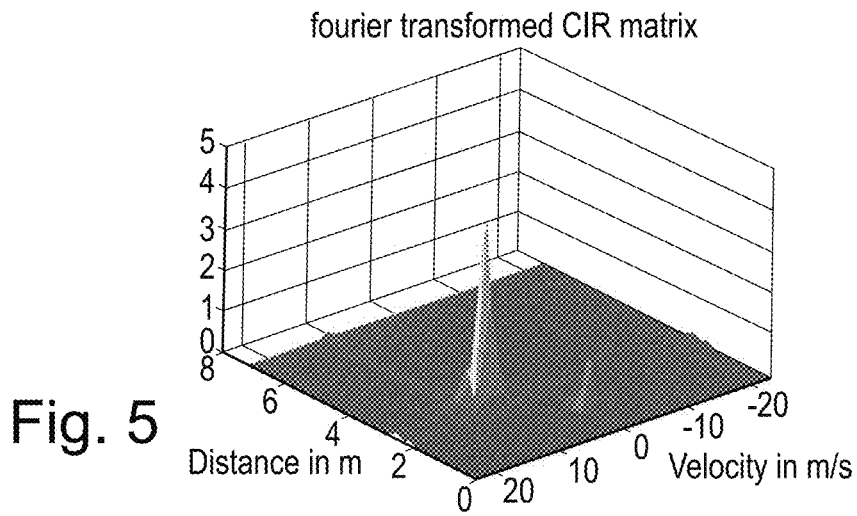
FIG. 5 illustrates a simulation of an FFT-CIR matrix for a line-of-sight path measurement after carrier characteristic offset compensation according to a further exemplary embodiment of the present disclosure.
Figure 6:
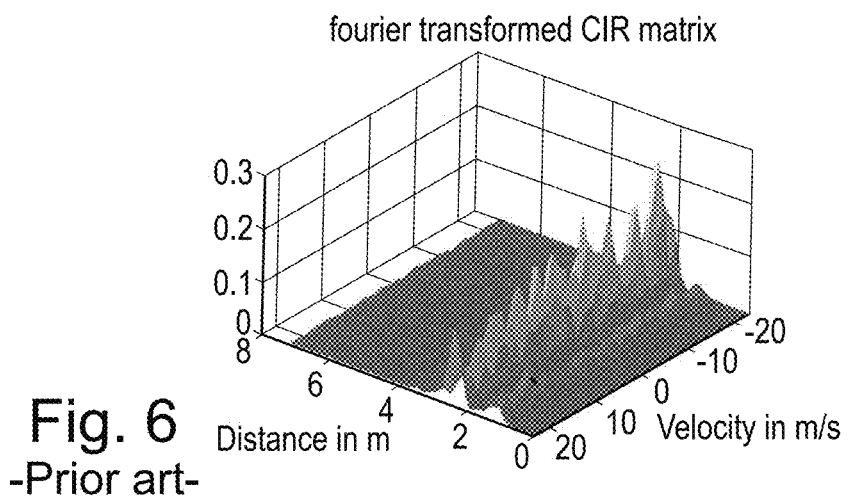
FIG. 6 illustrates a simulation of a conventional FFT-CIR matrix for a line-of-sight path measurement without carrier characteristic offset compensation.

FIG. 5 shows a simulation of an FFT-CIR matrix for line-of-sight path measurement with a carrier characteristic offset compensation. The line-of-sight path phase is in the range of +/−5 deg. The channel impulse responses can be added coherently.

Figure 7:
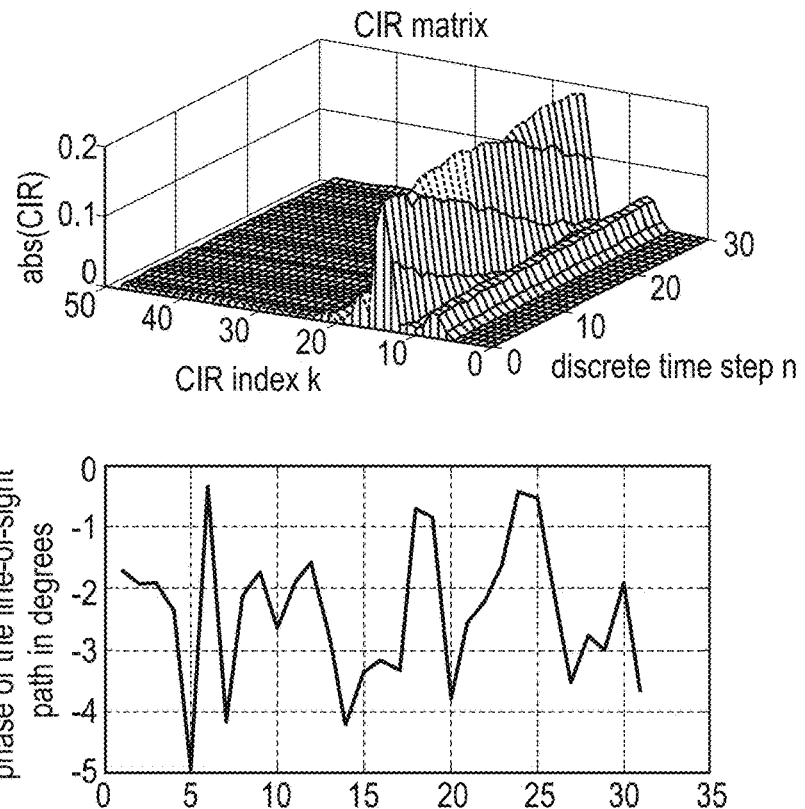
FIG. 7 illustrates a simulation of an FFT-CIR matrix for a distance measurement, which includes a movement, after carrier characteristic offset compensation according to a further exemplary embodiment of the present disclosure.
Figure 8:
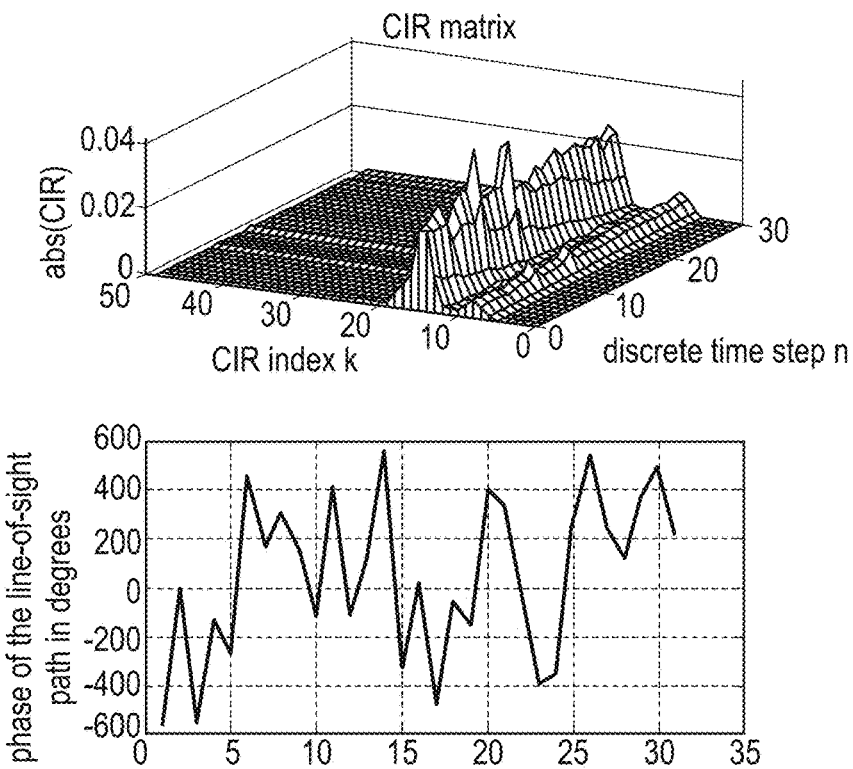
FIG. 8 illustrates a simulation of a conventional FFT-CIR matrix for distance measurement, which includes a movement, without carrier characteristic offset compensation.

FIG. 7 shows a simulation of an FFT-CIR matrix for distance measurement, which includes a movement (ranging measurement, Doppler map), after carrier characteristic offset compensation. A moving target and the line-of-sight path are clearly observable and identifiable.

The simulation set-up for FIGS. 5 to 8 is hereby as follows: the line-of-sight path between transmitter and receiver is used for synchronization (tracking path), the line-of-sight path is five times weaker than target reflection (radar path), target is moving with constant velocity (10 m/s) in front of the radar devices, the PLL is switched off between the frames and starts with a random start phase, the carrier frequency offset is 2 ppm of fc=6.4896 GHz.

REFERENCE NUMERALS

100 Radar system
105 Transmitter code generation unit
110 Transmitter
111 Transmitter antenna
112 Receiver antenna
120 Receiver
130 Control unit
140 Receiver code correlator
150 Target
160 Optimization loop
165 Combiner, RAKE receiver
C, C' Code
E Echo
O Output
S Code signal
T Tracking path

The invention claimed is:

1. A radar system, comprising:
a transmitter having a transmitter carrier frequency, the transmitter configured to transmit a code signal;
a receiver having a receiver carrier frequency, the receiver configured to receive an echo of the code signal; and
a control unit configured to:
identify a tracking path between the transmitter and the receiver;
estimate an offset between the transmitter carrier frequency and the receiver carrier frequency based on an index of the identified tracking path; and
compensate for the offset based on the estimation,
wherein the tracking path comprises a communication path that is at least partially independent of the code signal and the echo of the code signal.

2. The radar system according to claim 1, wherein the communication path of the tracking path is a static path.

3. The radar system according to claim 2, wherein the static path comprises at least one of the following:
a shortest distance between transmitter and receiver;
a line-of-sight path (LoS) between transmitter and receiver; or
a path that is not the path of highest signal to noise (S/N) ratio between transmitter and receiver.

4. The radar system according to claim 1, wherein the identification of the tracking path comprises communicating a communication signal between the transmitter and the receiver.

5. The radar system according to claim 1, wherein the tracking path comprises a combination of at least two paths.

6. The radar system according to claim 5, wherein the estimation of the offset further comprises at least one of the following:
correlating the echo of the code signal to a code template; or
accumulating a plurality of symbols of the echo of the code signal.

7. The radar system according to claim 1, wherein the control unit is further configured to:
compensate for an effect of a movement of at least one of the transmitter and the receiver.

8. The radar system according to claim 1, wherein the control unit is further configured to:
reconfigure the offset compensation for each transmitted code signal.

9. The radar system according to claim 1, wherein the control unit is further configured to:
perform an optimization loop to optimize the compensation of the offset.

10. The radar system according to claim 9, wherein the optimization loop comprises a combiner configured to combine at least two paths between the transmitter and the receiver to yield the tracking path.

11. The radar system according to claim 1, wherein the radar system is implemented as one of a monostatic radar application, a multi-static radar application, a statistical multiple-input, multiple-output (MIMO) application, or a coherent MIMO application.

12. The radar system according to claim 1, further comprising at least one of the following features:
wherein the radar system is a pulse radar system;
wherein the radar system is configured for transmitting and receiving ultra-wide band (UWB) signals, and echoes thereof; or
wherein a symbol of the code signal encodes a plurality of bits using a digital modulation scheme.

13. A method of operating a radar system, the method comprising:
transmitting a code signal by a transmitter having a transmitter carrier frequency;
receiving an echo of the code signal by a receiver having a receiver carrier frequency;
identifying a tracking path between the transmitter and the receiver;
estimating an offset between the transmitter carrier frequency and the receiver carrier frequency based on an index of the identified tracking path; and
compensating the offset based on the estimation,
wherein the tracking path comprises a communication path that is at least partially independent of the code signal and the echo of the code signal.

14. The method according of claim 13, wherein the identifying is done before the transmitting and the receiving.

15. The method of claim 13, wherein the identification of the tracking path comprises communicating a communication signal between the transmitter and the receiver.

16. The method of claim 13, wherein the tracking path comprises a combination of at least two paths.

17. The method of claim 13, further comprising:
   compensating for an effect of a movement of at least one of the transmitter and the receiver.

18. The method of claim 13, further comprising:
   reconfiguring the offset compensation for each transmitted code signal.

* * * * *